United States Patent [19]

McIntosh

[11] Patent Number: 5,297,586
[45] Date of Patent: Mar. 29, 1994

[54] FLEXIBLE METAL HOSE ASSEMBLY INCORPORATING MODIFIED BRAID RING WITH ANNULAR MEMBER HAVING TOOLS FLATS

[76] Inventor: Robert McIntosh, 220 Fox Hollow Dr., #310, Mayfield Heights, Ohio 44124

[21] Appl. No.: 33,102

[22] Filed: Mar. 16, 1993

[51] Int. Cl.⁵ .............................................. F16L 55/00
[52] U.S. Cl. ...................................... 138/109; 138/121; 285/286
[58] Field of Search ............... 138/109, 121, 122, 173; 285/149, 286

[56] References Cited

U.S. PATENT DOCUMENTS

| | | | |
|---|---|---|---|
| 1,675,808 | 7/1928 | Kliss | 285/286 |
| 2,150,471 | 3/1939 | Van Vulpen | 285/286 |
| 2,216,468 | 10/1940 | Farrar . | |
| 2,256,388 | 9/1941 | Fentress . | |
| 2,273,398 | 2/1942 | Couty et al. | 138/109 |
| 2,432,598 | 12/1947 | Westerhead | 285/286 |
| 2,472,455 | 6/1949 | Ansingh | 285/286 |
| 2,666,657 | 1/1954 | Howard et al. | 285/286 |
| 2,722,437 | 11/1955 | Phillips | 285/286 |
| 2,757,691 | 8/1956 | Copeland . | |
| 2,836,200 | 5/1958 | Webbe | 285/286 |
| 3,023,496 | 3/1962 | Millar | 285/286 |
| 3,198,560 | 8/1965 | Collins | 285/286 |
| 3,307,589 | 3/1967 | Sheffield | 138/109 |
| 3,627,354 | 12/1971 | Toepper . | |
| 3,840,256 | 10/1974 | Cox | 285/286 |
| 3,964,772 | 6/1976 | Cox | 285/286 |
| 4,089,351 | 5/1978 | Ward et al. . | |
| 4,564,223 | 1/1986 | Burrington | 285/286 |
| 4,756,560 | 7/1988 | Dobo et al. . | |
| 5,069,253 | 12/1991 | Hadley . | |
| 5,156,191 | 10/1992 | Walker et al. | 138/109 |

FOREIGN PATENT DOCUMENTS

| | | | |
|---|---|---|---|
| 2142068 | 3/1973 | Fed. Rep. of Germany | 138/109 |
| 72906 | 4/1960 | France | 138/109 |
| 955001 | 4/1964 | United Kingdom | 138/109 |

*Primary Examiner*—James E. Bryant, III
*Attorney, Agent, or Firm*—Fay, Sharpe, Beall, Fagan, Minnich & McKee

[57] ABSTRACT

A flexible metal hose assembly includes a corrugated tube surrounded by a braid. A modified braid ring is mechanically interconnected with an annular hex member. The modified braid ring is then located at the ends of the tube braid and welded to a fitting. The annular hex member of the modified braid ring still provides wrench flats to facilitate make up of the fitting.

19 Claims, 2 Drawing Sheets

FLEXIBLE METAL HOSE ASSEMBLY INCORPORATING MODIFIED BRAID RING WITH ANNULAR MEMBER HAVING TOOLS FLATS

BACKGROUND OF THE INVENTION

This invention pertains to the art of flexible hose assemblies and more particularly to metal hose assemblies. The invention is applicable to modifying a braid ring as conventionally used in a flexible hose assembly and will be described with reference thereto. However, it will be appreciated that the invention has broader applications and may be advantageously employed in other environments and applications requiring a modified braid ring.

Known methods of assembling a flexible metal hose use a braid ring located at one end of a helical or annular corrugated tube that is surrounded by a metal braid. The braid ring is dimensioned for close receipt over the tube and braid and facilitates termination of the hose assembly. Usually a fitting is abutted against the ends of the tube, braid and braid ring for subsequent welded or brazed interconnection of the various components.

Although a number of different fittings can be used as desired or required for a particular purpose, oftentimes a fitting incorporating a hex surface is used. The fitting is normally machined from bar stock and, if the fitting is to include a hex surface, slightly greater diameter bar stock is required and more machining is necessary to form the hex surface. For example, a male pipe fitting would require a simple external threading of a tubular workpiece where the workpiece is substantially identical in outer dimension to the completed fitting. Adding a hex surface to the male pipe fitting requires a substantially larger diameter workpiece for the same size threads because of the enlarged dimension of the hex surface. Therefore, a much greater amount of machining is required to reduce the diameter of the workpiece before the pipe threads are formed. Still further, the conventional incorporation of a hex surface on the fitting requires use of a longer fitting where in some instances the shortest possible fitting length is desired.

In other limited instances, a hex piece is added to a fitting that otherwise does not include a hex arrangement. The hex piece includes a smooth bore that is slipped over the fitting, e.g. a pipe nipple, to effect a hex arrangement.

Users of the flexible hose assembly often incorrectly grip the end of the hose assembly around the braid ring. The "damage" to the hose assembly is often no more than mechanical compression due to the light weight of the braid ring, and the hose being heat effected under the band. Nevertheless, this also imposes undue torque and stress on the hose at the base of the welded connection.

A certain amount of skill is also required to terminate the hose and join the fitting thereto. In the U.S., single pass welding is very seldom used, and even then, only in particular situations or after special setup. Instead, plural welds are required to complete the assembly. A first weld interconnects the corrugated tube, braid and braid ring. Thereafter, a second weld joins the fitting to the tube, braid and ring. It will be understood by those skilled in the art, though, that the subject invention is applicable to single or multiple pass welding, brazing, soldering, or fusion bonding.

Accordingly, it has been deemed desirable to manufacture flexible metal hose assemblies by eliminating the need for a hex head on the fitting, improve the weldability thereof, and provide a surface to effectively grip the end of the hose.

SUMMARY OF THE INVENTION

The present invention contemplates a new and improved hose assembly and method of forming same that overcomes all of the above-referenced problems and others and provides a simple, economically manufactured modified braid ring for use in a hose assembly.

According to the subject invention, a flexible hose assembly has a fluid line comprised of a tube and braid terminated at a first end and receiving a smooth-walled braid ring. An annular member having external, tool-receiving means is received over the ring and is connected thereto.

According to a more limited aspect of the invention, the annular member is mechanically interconnected with the ring to limit relative movement therebetween.

According to another aspect of the invention, the ring extends axially outward from the annular member a predetermined dimension.

According to a method of making the hose assembly, the ring and annular member are first mechanically connected together. The ring with the annular member, tube/braid, and fitting are then welded together.

A principal advantage of the invention resides in the ability to economically combine the annular member with a standard braid ring.

Another advantage of the invention is ability to use a less expensive hex portion in the hose assembly.

A further advantage of the invention is found in the ability to more easily weld the arrangement together.

Still another advantage results from the improved weld that is obtained in accordance with the teachings of this invention.

Still other advantages and benefits of the invention will become apparent to those skilled in the art upon a reading and understanding of the following description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
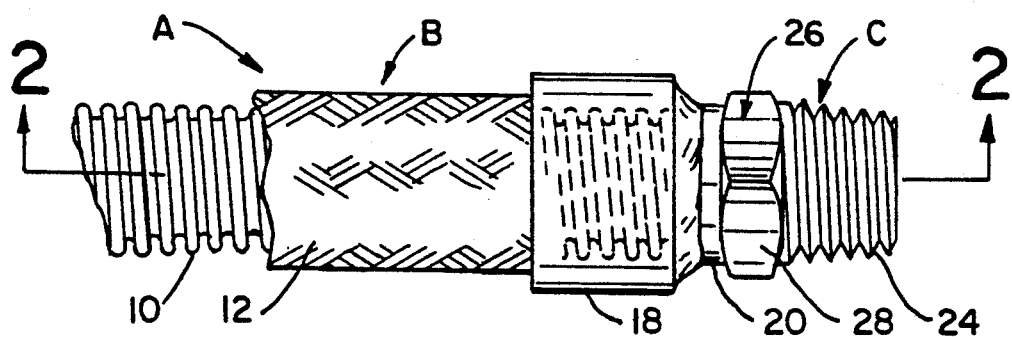
FIG. 1 is an elevational view of a prior art hose assembly.

Referring now to the drawings wherein the showings are for purposes of illustrating the preferred embodiment and method of the invention only, and not for purposes of limiting same, the FIGURES show a hose assembly A comprised of a flexible hose B and a fitting C.

Figure 2:
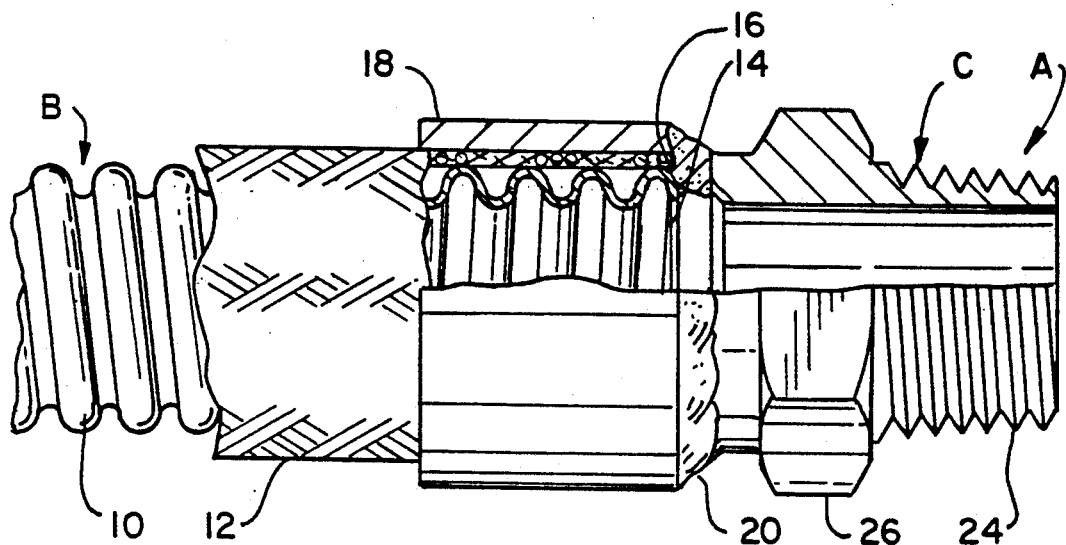
FIG. 2 is an enlarged longitudinal cross section of the prior art hose assembly of FIG. 1.

A conventional prior art method of securing a fitting to a terminal end of a flexible metal hose is shown in FIGS. 1 and 2. With reference to FIG. 1, a metal corrugated tube 10 is covered by a metal braid or sleeve 12. The corrugated tube may be either helical or annular, even though the drawing illustrates a helical and annular corrugated tube. The braid is a mesh arrangement providing a helical weave pattern that lends pressure carrier containment strength to the hose assembly while maintaining the desired flexible properties. A first end 4 of the tube is generally aligned with the first or terminal end of the braid, or the terminal end of the braid may extend slightly axially outward therefrom. A band or ring 8, often referred to as a braid ring, is received over the tube and braid and located adjacent the first ends thereof. Thus, the right-hand ends of the tube, braid, and ring are generally axially aligned as shown in FIG. 2.

The hose assembly incorporates a fitting c on the terminal end of the hose B. Any of a number of fittings can be used but a hex male pipe fitting is shown. The fitting includes a male threaded portion 24 that proceeds inwardly from one end and a hex head arrangement 26 adjacent the other end of the fitting. As will be appreciated, incorporation of the hex head on the fitting or another fitting with space for a gripping tool beyond the threads are conventional arrangements. As described above, though, the hex head adds to the overall cost of the fitting because of the need to machine the hex head from the bar stock and the requirement that the hex head be formed from the same material as the remainder of the fitting. The hex head includes tool receiving means such as tool flats 28 that facilitate make up of a coupling, i.e., joining the hose assembly fitting to a compatible fitting.

As illustrated in FIG. 2, the fitting is welded to the hose assembly as represented by numeral 20. The fitting is usually welded in a separate or second welding or brazing step after the tube, braid and ring have been initially secured together by a first welding/brazing operation.

Figure 3:
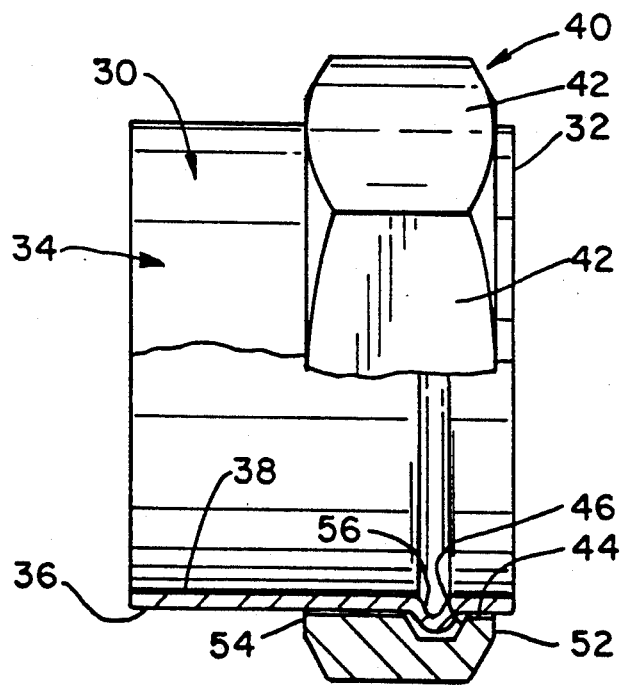
FIG. 3 is an elevational view of a modified braid ring in accordance with the subject invention, the lower half being shown in cross section.

More particularly, and with reference to FIG. 3, modified braid ring 3 has a first or right-hand end 32 and a second or left-hand end 34. The braid ring has a generally smooth-walled outer surface 36 and likewise a smooth-walled internal bore 38. The braid ring is preferably a single piece, cylindrical member having an internal dimension adapted for close receipt over the corrugated tube 10 and metal braid 12 of the hose assembly.

Figure 4:
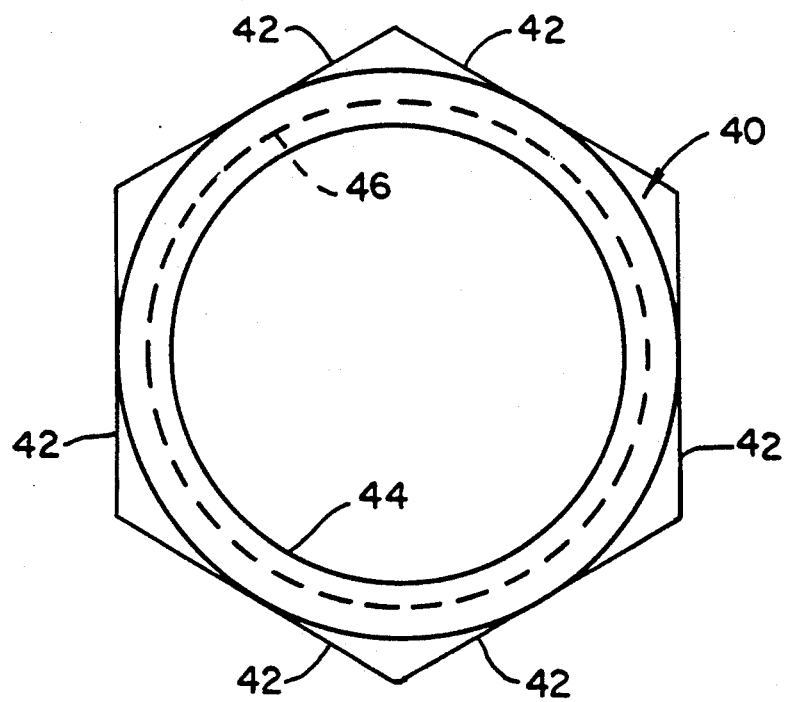
FIG. 4 is an end view of the annular member prior to receipt over the braid ring; and, FIG. 5 is an elevational view of a completed hose assembly in accordance with the subject invention.

Received about the braid ring 30 is an annular member or hex band 40. It includes tool receiving means such as wrench flats 42 along the external peripheral surface that are adapted to receive a conventional tool such as a wrench, pliers, or the like. As best illustrated in FIG. 4, the flats 42 have a corresponding flat disposed generally diametrically opposite therefrom to receive the tool. The hex band includes a central bore 44 dimensioned for closely dimensioned, but free, receipt over the outer surface 36 of the braid ring and is, in fact, sized to fit a selected range of braid ring sizes. Additionally, an inner peripheral groove 46 is defined between opposed ends 52, 54 of the hex band. As best illustrated in FIG. 3, and according to the preferred arrangement, the groove 46 cooperates with a radially outward extending protrusion 56 formed in the modified braid ring to define a means for limiting relative movement between the hex band and braid ring.

According to one preferred arrangement, the protrusion 56 is circumferentially continuous and axially interlocks the braid ring and hex band together. The hex band may still rotate relative to the braid ring and this interconnection defines a "mechanical connection". The mechanical connection can comprise any of a number of intercooperating configurations, e.g., spaced projections, grooves, alternating grooves and projections, etc., of the hex band and braid ring, irrespective of whether the hex band and braid ring can rotate relative to one another. Generally, though, the mechanical connection is not intended to include a welded interconnection. As will become apparent below, since the modified braid ring with the annular hex band is eventually welded to the fitting and hose, a welded interconnection is not preferred. Moreover, the hex band may be formed from the same material as the braid ring or, for other applications, can be formed from a dissimilar material.

As is best illustrated in FIG. 3, the first end 32 of the braid ring extends axially outward a predetermined dimension from the first end 2 of the hex band. By controlling the location of the protrusion 56, this predetermined dimension can be varied as desired. The predetermined dimension facilitates subsequent welding of the arrangement together with the hose and fitting, while locating the hex band sufficiently close to the fitting to itself become secured thereto in the welding operation.

The hex band also serves the advantageous function of providing a heat sink during the welding operation. As is well known in the art, an experienced welder is required to weld a braid ring, braid, tube, and fitting together. With the modified braid ring incorporating the hex band of the subject invention, the welded connection is easier since the welder need not be as precise. Due to the materials involved, and the hex band added to the braid ring, the weld is easier to control and, in general, is not a technically difficult weld.

Figure 5:
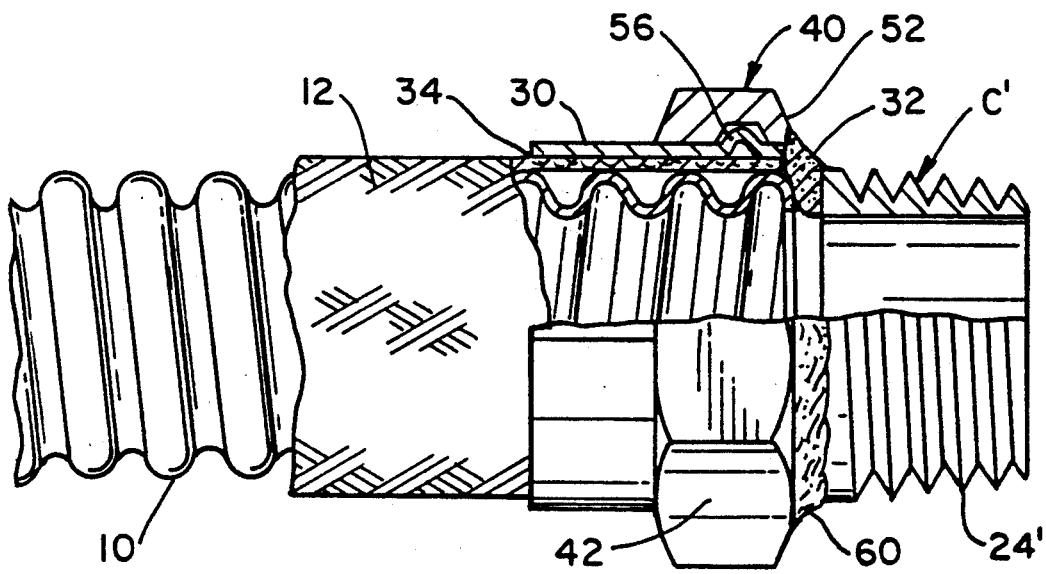

The completed hose assembly is best illustrated in FIG. 5. As shown, the fitting is a more simplified, less expensive male pipe fitting in which the incorporated hex has been eliminated, along with the space associated with it, and as apparent in a comparison with the arrangement of FIG. 1. Nevertheless, the modified braid ring with the hex band still provides a tool receiving area located closely adjacent the welded connection and that facilitates make up of the coupling. In substantially all other respects, the hose assembly is substantially identical to that shown in FIG. 1. That is, first ends 14, 16 of the corrugated tube and metal braid are terminated and generally axially aligned. The conventional braid ring 18 of FIG. 1 is then substituted with the combined braid ring 30 and hex band 40 of the subject invention. The fitting C' is then brought into abutting engagement with the modified braid ring, braid, and corrugate tube. The fitting eliminates the hex head 2 shown in FIG. 1 and merely includes a male thread portion 24' (FIG. 5). As indicated above, this results in a substantial reduction in machining and cost without any resultant loss in benefits and functions as provided by the hex band 40. Also, the hex band is not a wetted component so that an alternate material can be used that is less expensive, resulting in potential cost savings. Once disposed in abutting engagement, the weld 60 is completed to interconnect the tube, braid, braid ring, hex band 40, and fitting C'.

The invention has been described with reference to the preferred embodiment and method. Obviously, modifications and alterations will occur to others upon a reading and understanding of this specification. For example, the hose assembly is most often fabricated with braid or braids but the braid(s) is sometimes eliminated from a hose assembly. The modified braid ring can be used substantially as described above for those applications where no braid is employed, or in a variety of sizes.

Still other fittings or attachments can be substituted for the above described pipe fitting and secured to the hose assembly incorporating the modified braid ring. In fact, in some instances it may be desired to have a hex surface on both the fitting and the braid ring. Alternatively, a hex surface is provided by the modified braid ring without incorporating a fitting into the hose assembly.

This invention provides a hex surface, or backup hex surface, for example with swivel fittings, without having to add additional space for such a hex surface, or for those arrangements where there is really no other practical way to provide a hex surface. The modified braid ring, in effect, provides a terminated metal hose assembly without any fitting attached, yet still offers all of the benefits of a hex surface incorporated into the modified braid ring.

Moreover, in selected circumstances it is envisioned that the hex band may be attached to the braid ring but not incorporated into the final welded assembly. The subject invention is intended to include all such modifications and alterations insofar as they come within the scope of the appended claims or the equivalents thereof.

Having thus described the invention, it is claimed:

1. A flexible hose assembly comprising:
   a corrugated tube having a first end;
   a braid ring received over the tube and having a first end generally aligned with the tube first end, the ring having a smooth outer surface; and
   an annular member closely received over the ring, the annular member having at least first and second tool receiving flats generally diametrically disposed on its outer peripheral surface adapted to receive an associated tool, the ring and annular member being mechanically connected together to limit relative movement therebetween.

2. The hose assembly as defined in claim 1 further comprising a coupling member secured to the first ends of the tube and ring.

3. The hose assembly as defined in claim 2 wherein the coupling member is welded to the annular member.

4. The hose assembly as defined in claim 1 wherein the annular member includes a circumferential groove along the inner periphery and the ring includes a portion that extends radially outward for receipt in the groove to interconnect the ring and annular member.

5. The hose assembly as defined in claim 4 wherein the ring portion is a circumferentially continuous projection that is received in the annular member groove.

6. The hose assembly as defined in claim 1 wherein the braid ring first end extends axially outward a predetermined dimension from the annular member.

7. The hose assembly as defined in claim 1 further comprising a braid received around the tube beneath the ring and being generally axially coextensive therewith, the braid having a first end aligned with the tube end.

8. In a flexible hose assembly having a corrugated tube adapted to receive pressurized fluid from an associated source, the fluid line terminating at a firs end with a generally smooth walled ring received around the fluid line first end, the improvement comprising an annular member received over the ring and being connected thereto to limit movement between the ring and annular member, the annular member including at least two tool receiving flats generally diametrically disposed on an external peripheral surface thereof adapted to receive an associated tool.

9. The invention as defined in claim 8 wherein the ring and annular member are mechanically connected together.

10. The invention as defined in claim 9 wherein the annular member includes an internal peripheral groove that receives a radially extending projection of the ring to limit relative axial movement therebetween.

11. The invention as defined in claim 10 wherein a first end of the ring extends axially a predetermined dimension from the annular member.

12. The invention as defined in claim 8 further comprising a fitting secured to the first end of the fluid line, ring and the annular member.

13. The invention as defined in claim 8 further comprising a fitting welded to the first end of the fluid line, ring and the annular member.

14. The invention as defined in claim 8 wherein the ring and annular member are formed from metal.

15. A flexible metal hose assembly comprising:
    a corrugated metal tube having a first end;
    a metal braid received over and generally axially coextensive with the tube, the braid having a first end aligned with the tube first end;
    a metal ring received over the tube and braid adjacent the first ends thereof, the ring having a generally smooth walled external periphery and a first end substantially aligned with the first ends of the tube and braid; and
    an metal annular member received over the ring and being mechanically connected thereto, the annular member including tool flats on an external periphery thereof.

16. The flexible hose assembly as defined in claim 15 wherein the annular member includes an inner peripheral groove and the ring includes a radially outward extending protrusion received in the groove for limiting relative axial movement therebetween.

17. The flexible hose assembly as defined in claim 15 wherein the first end of the ring extends axially a predetermined dimension from the annular member.

18. The flexible hose assembly as defined in claim 15 further comprising a fitting having a first end welded to the first ends of the tube, braid and ring.

19. The flexible hose assembly as defined in claim 18 wherein the fitting is welded to the annular member.

* * * * *